(12) United States Patent
Lee et al.

(10) Patent No.: US 9,665,506 B2
(45) Date of Patent: May 30, 2017

(54) APPARATUS AND METHOD FOR PROCESSING DATA

(71) Applicant: SK hynix Inc., Icheon-si (KR)

(72) Inventors: Sang Eun Lee, Icheon (KR); Chang il Kim, Cheongju (KR); Oung Sic Cho, Icheon (KR)

(73) Assignee: SK HYNIX INC., Icheon (KR)

( * ) Notice: Subject to any disclaimer, the term of this patent is extended or adjusted under 35 U.S.C. 154(b) by 373 days.

(21) Appl. No.: 14/286,911

(22) Filed: May 23, 2014

(65) Prior Publication Data

US 2015/0186309 A1 Jul. 2, 2015

(30) Foreign Application Priority Data

Dec. 31, 2013 (KR) .......................... 10-2013-0168659

(51) Int. Cl.
*G06F 13/38* (2006.01)
*G06F 13/16* (2006.01)
*G06F 11/27* (2006.01)
*G06F 17/30* (2006.01)

(52) U.S. Cl.
CPC ........ *G06F 13/1678* (2013.01); *G06F 13/385* (2013.01); *G06F 11/27* (2013.01); *G06F 17/30424* (2013.01)

(58) Field of Classification Search
CPC ... G06F 13/385; G06F 11/27; G06F 17/30424
See application file for complete search history.

(56) References Cited

U.S. PATENT DOCUMENTS

| 6,240,043 B1* | 5/2001 | Hanson | G11C 7/1006 365/230.08 |
|---|---|---|---|
| 8,941,513 B1* | 1/2015 | Dupont | H03M 7/6088 341/50 |
| 2002/0118204 A1* | 8/2002 | Aleksic | G06T 1/60 345/544 |
| 2005/0240604 A1* | 10/2005 | Corl, Jr. | H03M 7/30 |
| 2007/0016724 A1* | 1/2007 | Gaither | G06F 12/023 711/105 |
| 2009/0006685 A1* | 1/2009 | Rieke | G06F 13/385 710/104 |
| 2011/0001531 A1* | 1/2011 | Nishi | H03L 7/0807 327/162 |
| 2011/0196849 A1* | 8/2011 | Hays | H03M 7/46 707/693 |
| 2013/0006981 A1 | 1/2013 | Shim et al. | |

(Continued)

FOREIGN PATENT DOCUMENTS

KR   10-2012-0134916 A   12/2012

*Primary Examiner* — Henry Tsai
*Assistant Examiner* — Christopher A Daley

(57) ABSTRACT

A data processing device includes a controller. The controller includes a compression circuit configured to compare a plurality of data groups, each of which has a first burst length and is transmitted in units of an input/output width, with a predetermined pattern, and perform data compression on the data groups based on a result of comparison. The controller further includes a compression data restructuring circuit configured to generate a transmission data group by restructuring the compressed data group to have a second burst length.

19 Claims, 13 Drawing Sheets

(56) References Cited

U.S. PATENT DOCUMENTS

| | | | |
|---|---|---|---|
| 2013/0099947 A1* | 4/2013 | Dickie | H03M 7/4037 341/59 |
| 2014/0139537 A1* | 5/2014 | Ghosh | G06F 3/14 345/547 |
| 2014/0177710 A1* | 6/2014 | Komi | H04N 19/00569 375/240.12 |
| 2014/0219573 A1* | 8/2014 | Teng | G06T 9/00 382/232 |

* cited by examiner

| | B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|---|
| D0 | 0 | 1 | 1 | 0 | 1 | 1 | 0 | 1 | 0 | 0 | 1 | 1 | 0 | 1 | 0 | 0 |
| D1 | 0 | 1 | 1 | 0 | 1 | 1 | 0 | 1 | 1 | 0 | 1 | 1 | 0 | 1 | 1 | 0 |
| D2 | 0 | 1 | 1 | 0 | 1 | 0 | 0 | 1 | 0 | 0 | 1 | 0 | 0 | 1 | 0 | 0 |
| D3 | 0 | 1 | 0 | 0 | 1 | 0 | 0 | 1 | 0 | 0 | 0 | 0 | 0 | 1 | 0 | 0 |
| D4 | 1 | 0 | 1 | 1 | 0 | 1 | 1 | 0 | 1 | 1 | 0 | 1 | 1 | 0 | 1 | 1 |
| D5 | 1 | 0 | 1 | 1 | 0 | 0 | 1 | 0 | 1 | 1 | 0 | 0 | 1 | 0 | 1 | 1 |
| D6 | 1 | 0 | 0 | 1 | 0 | 0 | 1 | 0 | 0 | 1 | 0 | 0 | 1 | 0 | 0 | 1 |
| D7 | 1 | 0 | 0 | 1 | 0 | 0 | 1 | 0 | 0 | 1 | 0 | 0 | 1 | 0 | 0 | 1 |

Fig.3

| | P0 | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|---|
| D0 | 0 | 1 | 0 | 1 | 0 | 1 | 0 | 1 | 0 | 1 | 0 | 1 | 0 | 1 | 0 | 1 |
| D1 | 0 | 1 | 0 | 1 | 0 | 1 | 0 | 1 | 0 | 1 | 0 | 1 | 0 | 1 | 0 | 1 |
| D2 | 0 | 0 | 1 | 1 | 0 | 0 | 1 | 1 | 0 | 0 | 1 | 1 | 0 | 0 | 1 | 1 |
| D3 | 0 | 0 | 1 | 1 | 0 | 0 | 1 | 1 | 0 | 0 | 1 | 1 | 0 | 0 | 1 | 1 |
| D4 | 0 | 0 | 0 | 0 | 1 | 1 | 1 | 1 | 0 | 0 | 0 | 0 | 1 | 1 | 1 | 1 |
| D5 | 0 | 0 | 0 | 0 | 1 | 1 | 0 | 0 | 1 | 1 | 0 | 0 | 1 | 1 | 1 | 1 |
| D6 | 0 | 0 | 0 | 0 | 0 | 0 | 0 | 1 | 1 | 1 | 1 | 1 | 1 | 1 | 1 | 1 |
| D7 | 0 | 0 | 0 | 1 | 0 | 1 | 1 | 1 | 1 | 1 | 0 | 1 | 0 | 1 | 0 | 1 |
| CP0 | 0 | 1 | 0 | 1 | 1 | 0 | 1 | 1 | 0 | 0 | 1 | 1 | 0 | 0 | 1 | 1 |
| CP1 | 0 | 0 | 0 | 0 | 1 | 1 | 1 | 1 | 0 | 0 | 0 | 0 | 1 | 0 | 1 | 1 |
| CP2 | 0 | 0 | 0 | 0 | 0 | 0 | 0 | 0 | 1 | 1 | 1 | 1 | 0 | 0 | 1 | 1 |
| CP3 | 0 | 0 | 0 | 0 | 0 | 0 | 0 | 0 | 1 | 1 | 1 | 1 | 1 | 1 | 1 | 1 |

Fig.4

| | B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|---|
| CDQ0 | 0 | 1 | 1 | 0 | 1 | 1 | 0 | 1 | 0 | 0 | 1 | 1 | 0 | 1 | 0 | 0 |
| CDQ1 | 0 | 1 | 1 | 0 | 1 | 1 | 0 | 1 | 1 | 0 | 1 | 1 | 0 | 1 | 1 | 0 |
| CDQ2 | 1 | 0 | 1 | 1 | 0 | 0 | 1 | 0 | 0 | 1 | 0 | 0 | 1 | 0 | 0 | 1 |
| CDQ3 | 1 | 0 | 0 | 1 | 0 | 0 | 1 | 0 | 0 | 1 | 0 | 0 | 1 | 0 | 0 | 1 |
| CDQ4 |   |   | 1 |   |   | 0 |   |   | 1 |   |   | 1 |   |   | 1 |   |
| CDQ5 |   |   | 1 |   |   | 1 |   |   | 1 |   |   | 0 |   |   | 1 |   |
| CDQ6 |   |   | 0 |   |   | 0 |   |   | 0 |   |   | 0 |   |   | 0 |   |
| CDQ7 |   |   | 0 |   |   | 0 |   |   | 0 |   |   | 0 |   |   | 0 |   |
| CF | 1 | 1 | 0 | 1 | 1 | 0 | 1 | 1 | 0 | 1 | 1 | 0 | 1 | 1 | 0 | 1 |

Fig.5

| | NB0 | NB1 | NB2 | NB3 | NB4 | NB5 | NB6 | NB7 | NB8 | NB9 | NB10 | B11 | B12 | B13 | B14 | B15 |
|---|---|---|---|---|---|---|---|---|---|---|---|---|---|---|---|---|
| DQ0 | 0 | 1 | 0 | 1 | 0 | 0 | 0 | 1 | 0 | 0 | 0 | | | | | |
| DQ1 | 0 | 1 | 0 | 1 | 0 | 1 | 0 | 1 | 0 | 1 | 0 | | | | | |
| DQ2 | 1 | 1 | 1 | 0 | 1 | 0 | 1 | 0 | 1 | 0 | 1 | | | | | |
| DQ3 | 1 | 0 | 1 | 0 | 1 | 0 | 1 | 0 | 1 | 0 | 1 | | | | | |
| DQ4 | 1 | 1 | 1 | 0 | 1 | 1 | 1 | 0 | 1 | 1 | | | | | | |
| DQ5 | 1 | 1 | 1 | 1 | 1 | 1 | 1 | 0 | 1 | 1 | | | | | | |
| DQ6 | 0 | 0 | 0 | 0 | 0 | 0 | 0 | 0 | 0 | 0 | | | | | | |
| DQ7 | 0 | 0 | 0 | 0 | 0 | 0 | 0 | 0 | 0 | 0 | | | | | | |

Fig.6

| | FB0 | FB1 | NB0 | NB1 | NB2 | NB3 | NB4 | NB5 | NB6 | NB7 | NB8 | NB9 | NB10 | B11 | B12 | B13 | B14 | B15 |
|---|---|---|---|---|---|---|---|---|---|---|---|---|---|---|---|---|---|---|
| DQ0 | CF0 | CF8 | 0 | 1 | 0 | 1 | 0 | 1 | 0 | 1 | 0 | 1 | 0 | | | | | |
| DQ1 | CF1 | CF9 | 0 | 1 | 0 | 1 | 0 | 1 | 0 | 1 | 0 | 1 | 0 | | | | | |
| DQ2 | CF2 | CF10 | 1 | 0 | 1 | 0 | 1 | 0 | 1 | 0 | 1 | 0 | 1 | | | | | |
| DQ3 | CF3 | CF11 | 1 | 0 | 1 | 0 | 1 | 0 | 1 | 0 | 1 | 0 | 1 | | | | | |
| DQ4 | CF4 | CF12 | 1 | 1 | 1 | 1 | 1 | 1 | 1 | 1 | 1 | 1 | | | | | | |
| DQ5 | CF5 | CF13 | 1 | 0 | 0 | 0 | 0 | 0 | 0 | 0 | 0 | 0 | | | | | | |
| DQ6 | CF6 | CF14 | 0 | 0 | 0 | 0 | 0 | 0 | 0 | 0 | 0 | 0 | | | | | | |
| DQ7 | CF7 | CF15 | 0 | 0 | 0 | 0 | 0 | 0 | 0 | 0 | 0 | 0 | | | | | | |

Fig.7

|    | B0 | B1 | B2 | B3 | B4 | B5 | B6 | B7 | B8 | B9 | B10 | B11 | B12 | B13 | B14 | B15 |
|----|----|----|----|----|----|----|----|----|----|----|-----|-----|-----|-----|-----|-----|
| D0 | 0  | 0  | 0  | 0  | 1  | 1  | 1  | 1  | 0  | 0  | 0   | 0   | 1   | 1   | 1   | 1   |
| D1 | 1  | 1  | 1  | 1  | 0  | 0  | 0  | 0  | 1  | 1  | 1   | 1   | 0   | 0   | 0   | 0   |
| D2 | 0  | 0  | 0  | 0  | 1  | 1  | 1  | 1  | 0  | 0  | 0   | 0   | 1   | 1   | 1   | 1   |
| D3 | 0  | 0  | 0  | 0  | 1  | 1  | 1  | 0  | 0  | 0  | 0   | 0   | 1   | 1   | 1   | 1   |
| D4 | 0  | 0  | 0  | 0  | 1  | 1  | 0  | 1  | 0  | 0  | 0   | 0   | 1   | 1   | 1   | 1   |
| D5 | 1  | 1  | 1  | 1  | 0  | 0  | 1  | 0  | 1  | 1  | 1   | 1   | 0   | 0   | 0   | 0   |
| D6 | 0  | 0  | 0  | 0  | 1  | 1  | 1  | 1  | 0  | 0  | 0   | 0   | 1   | 1   | 1   | 1   |
| D7 | 0  | 0  | 0  | 0  | 1  | 1  | 1  | 0  | 0  | 0  | 0   | 0   | 1   | 1   | 1   | 1   |

Fig.8

|     | B0 | B1 | B2 | B3 | B4 | B5 | B6 | B7 | CP0 | CP1 | CP2 | CP3 |
|-----|----|----|----|----|----|----|----|----|-----|-----|-----|-----|
| P0  | 0  | 0  | 0  | 0  | 0  | 0  | 0  | 0  | 0   | 0   | 0   | 0   |
| P1  | 0  | 0  | 0  | 0  | 0  | 0  | 1  | 1  | 0   | 0   | 0   | 1   |
| P2  | 0  | 0  | 0  | 0  | 1  | 1  | 0  | 0  | 0   | 0   | 1   | 0   |
| P3  | 0  | 0  | 0  | 0  | 1  | 1  | 1  | 1  | 0   | 0   | 1   | 1   |
| P4  | 0  | 0  | 1  | 1  | 0  | 0  | 0  | 0  | 0   | 1   | 0   | 0   |
| P5  | 0  | 0  | 1  | 1  | 0  | 0  | 1  | 1  | 0   | 1   | 0   | 1   |
| P6  | 0  | 0  | 1  | 1  | 1  | 1  | 0  | 0  | 0   | 1   | 1   | 0   |
| P7  | 0  | 0  | 1  | 1  | 1  | 1  | 1  | 1  | 0   | 1   | 1   | 1   |
| P8  | 1  | 1  | 0  | 0  | 0  | 0  | 0  | 0  | 1   | 0   | 0   | 0   |
| P9  | 1  | 1  | 0  | 0  | 0  | 0  | 1  | 1  | 1   | 0   | 0   | 1   |
| P10 | 1  | 1  | 0  | 0  | 1  | 1  | 0  | 0  | 1   | 0   | 1   | 0   |
| P11 | 1  | 1  | 0  | 0  | 1  | 1  | 1  | 1  | 1   | 0   | 1   | 1   |
| P12 | 1  | 1  | 1  | 1  | 0  | 0  | 0  | 0  | 1   | 1   | 0   | 0   |
| P13 | 1  | 1  | 1  | 1  | 0  | 0  | 1  | 1  | 1   | 1   | 0   | 1   |
| P14 | 1  | 1  | 1  | 1  | 1  | 1  | 0  | 0  | 1   | 1   | 1   | 0   |
| P15 | 1  | 1  | 1  | 1  | 1  | 1  | 1  | 1  | 1   | 1   | 1   | 1   |

Fig.9

| | B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|---|
| CDQ0 | 0 | 0 | 1 | 1 | 0 | 0 | 1 | 1 | | | | | | | | |
| CDQ1 | 1 | 1 | 0 | 0 | 1 | 1 | 0 | 0 | | | | | | | | |
| CDQ2 | 0 | 0 | 1 | 1 | 1 | 0 | 0 | 0 | 1 | 1 | 1 | 1 | | | | |
| CDQ3 | 0 | 0 | 0 | 0 | 1 | 1 | 1 | 0 | 0 | 0 | 1 | 1 | | | | |
| CDQ4 | 0 | 0 | 1 | 1 | 0 | 0 | 1 | 1 | | | | | | | | |
| CDQ5 | 1 | 1 | 0 | 0 | 1 | 1 | 0 | 0 | | | | | | | | |
| CDQ6 | 0 | 0 | 1 | 1 | 1 | 0 | 0 | 0 | 1 | 1 | 1 | 1 | | | | |
| CDQ7 | 0 | 0 | 0 | 0 | 1 | 1 | 1 | 0 | 0 | 0 | 1 | 1 | | | | |

Fig. 10

| | FB0 | FB1 | B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|---|---|---|
| DQ0 | 1 | 1 | 0 | 0 | 1 | 1 | 0 | 0 | 1 | 1 |   |   |   |   |   |   |   |   |
| DQ1 | 1 | 1 | 1 | 1 | 0 | 0 | 1 | 1 | 0 | 0 |   |   |   |   |   |   |   |   |
| DQ2 | 1 | 0 | 0 | 0 | 1 | 1 | 1 | 0 | 0 | 0 | 1 | 1 | 1 | 1 |   |   |   |   |
| DQ3 | 0 | 1 | 0 | 0 | 0 | 0 | 0 | 1 | 1 | 0 | 0 | 0 | 1 | 1 |   |   |   |   |
| DQ4 | 1 | 1 | 1 | 1 | 0 | 1 | 1 | 0 | 0 | 1 |   |   |   |   |   |   |   |   |
| DQ5 | 1 | 1 | 0 | 0 | 1 | 0 | 1 | 1 | 0 | 0 |   |   |   |   |   |   |   |   |
| DQ6 | 1 | 0 | 0 | 0 | 1 | 1 | 1 | 0 | 0 | 0 | 1 | 1 | 1 | 1 |   |   |   |   |
| DQ7 | 0 | 1 | 0 | 0 | 0 | 0 | 1 | 1 | 1 | 0 | 0 | 0 | 1 | 1 |   |   |   |   |

Fig. 11

APPARATUS AND METHOD FOR PROCESSING DATA

CROSS-REFERENCE TO RELATED APPLICATION

This application claims priority based upon Korean Patent Application No. 10-2013-0168659, filed on Dec. 31, 2013, the disclosure of which is hereby incorporated in its entirety by reference herein.

BACKGROUND

Embodiments of the present disclosure relate to an apparatus and method for processing data, and more particularly, to an apparatus and method for processing data which can compress data on the basis of a predetermined pattern.

In recent times, as the desire for smaller-sized and higher-speed electronic appliances has increased, research into miniaturization and increasing the speed of electronic appliances has been conducted. For miniaturization of electronic appliances, techniques for miniaturizing circuits included in the electronic appliance can be used. For implementation of higher-speed electronic appliances, techniques for improving an internal signal transmission timing can be used.

If data is compressed before being transmitted among internal constituent elements of electronic appliances, power needed for data transmission can be reduced, and a time needed for transmitting the data can also be reduced, such that smaller-sized and higher-speed electronic appliances can be implemented.

SUMMARY

Various embodiments of the present disclosure are directed to providing an apparatus and method for processing data that substantially obviates one or more problems due to limitations and disadvantages of the related art.

Embodiments of the present disclosure relate to an apparatus and method for processing data which can compress data on the basis of a predetermined pattern so as to reduce the amount of data, and which can restructure and transmit the reduced amount of data, resulting in an increased transmission speed of data.

Embodiments relate to an apparatus and method for processing data by comparing the data with a predetermined pattern either in a direction of a burst length or in a direction of an input/output width, and performing data compression, such that a total burst length of data is reduced and a data transfer rate is improved.

In an embodiment, a data processing device includes a compression circuit and a compression data restructuring circuit. The compression circuit compares a data group with a predetermined pattern, and performs data compression on the data group based on a result of comparison. The data group includes a number of bursts according to a first burst length and each burst includes a number of bits equal to an input/output (I/O) width. The comparison data restructuring circuit generates a transmission data group by restructuring the compressed data group to have a second burst length.

In another embodiment, a data processing method includes comparing a data group with a predetermined pattern, performing data compression on the data group based on a result of the comparison, generating flag information indicating compression of data. The method further includes generating a transmission data group by restructuring the compressed data group according to a second burst length, and transmitting the flag information and the transmission data group through a physical connector. The data group includes a number of bursts according to a first burst length and each burst includes a number of bits equal to an I/O width.

Both the foregoing general description and the following detailed description are illustrative and explanatory, and the claims are not limited thereby.

BRIEF DESCRIPTION OF THE DRAWINGS

The above and other embodiments will become apparent by reference to the following detailed description when considered in conjunction with the accompanying drawings.

FIGS. 3 to 5 are diagrams illustrating performing data compression in blocks of an I/O width according to an embodiment.

FIG. 6 is a diagram illustrating restructuring a compressed data group in blocks of an I/O width according to an embodiment.

FIG. 7 is a diagram illustrating parallelizing flag information and transmitting the parallelized flag information along with a transmission data group, according to an embodiment.

FIGS. 8 to 11 are diagrams illustrating performing data compression in blocks of a burst length according to an embodiment.

DETAILED DESCRIPTION

Reference will now be made in detail to embodiments of the present disclosure which are illustrated in the accompanying drawings. Wherever possible, the same reference numbers will be used throughout the drawings to refer to the same or like parts.

In association with embodiments of the present disclosure, specific structural and functional descriptions are disclosed for illustrative purposes, and the embodiments of the present disclosure can be implemented in various ways without departing from the scope or spirit of the present disclosure.

Figure 1:
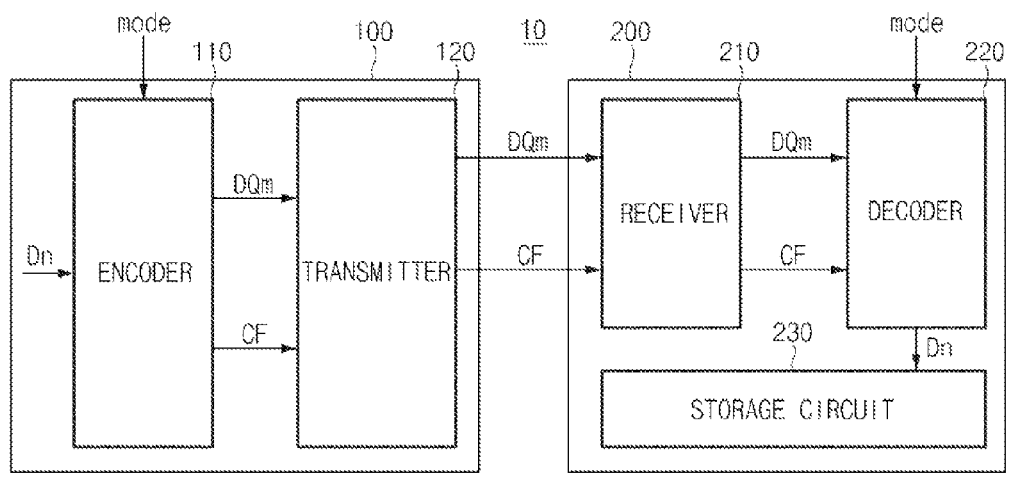
FIG. 1 illustrates a diagram of a data processing apparatus according to an embodiment.

FIG. 1 illustrates a diagram of a data processing apparatus 10 according to an embodiment. The data processing apparatus 10 includes a controller 100 and a memory device 200.

The controller 100 generates various signals for controlling the memory device 200, and transmits the generated signals to the memory device 200. The controller 100 may transmit various data and control signals such as command/address signals to the memory device 200, including transmission (Tx) data DQm and flag information CF.

Although not shown in the drawings, in an embodiment, the controller 100 may receive data from the memory device 200. The received (Rx) data may be data that had been compressed and processed in the same manner as employed when the controller 100 transmits Tx data DQm and transmitted to the memory device 200. The controller 100 may also receive flag information CF indicating compression or non-compression of the Rx data.

The controller 100 includes an encoder 110 and a transmitter 120.

The encoder 110 determines a compression scheme of a data group Dn on the basis of a mode signal mode. The compression scheme determined according to the mode signal mode may compress the data group Dn in blocks according to an I/O width, or may compress the data group Dn in blocks according to a burst length.

The I/O width may be a number of a plurality of connectors of an I/O data circuit interposed between the controller 100 and the memory device 200 and connected in parallel such that data can be simultaneously transmitted. The burst length may be a number of bits capable of being provided through one connector during one burst operation. The I/O width and the burst length will hereinafter be described with reference to FIG. 3.

The encoder 110 compares a data group Dn with a predetermined pattern in compression blocks having a length of an I/O width or of a burst length, according to the mode signal mode. The encoder 110 performs data compression based on a result of the comparison, and generates a compressed transmission data group DQm and flag information CF for each compression block indicating whether the data group (Dn) is compressed.

The data group Dn compressed by the encoder 110 may have a shorter burst length than an original burst length. The encoder 110 may generate the transmission data group DQm by restructuring the data to have a burst length different from the burst length of the original burst group Dn, and transmit the generated transmission data group DQm to the transmitter 120.

The transmitter 120 receives the Tx data group DQm and flag information CF from the encoder 110 and transmits the Tx data group DQm and the flag information CF to the memory device 200. In an embodiment, the Tx data group DQm and the flag information CF may be supplied to the memory device 200 through a physical connector.

In an embodiment, the Tx data group DQm and the flag information CF may be supplied to the memory device 200 through different physical connectors. In another embodiment, the Tx data group DQm and the flag information CF may be transmitted through the same physical connector.

When the Tx data group DQm and the flag information CF are transmitted through the same physical connector, the flag information CF may be attached to a front end or back end of the Tx data group DQm, such that the resultant data including the flag information CF may be transmitted. FIG. 7 illustrates a diagram related to transmitting flag information CF and Tx data group DQm through the same physical connector.

The memory device 200 includes a receiver 210 and a decoder 220.

The receiver 210 receives a Tx data group DQm and flag information CF from the controller 100, and supplies the received Tx data group DQm and the flag information CF to the decoder 220.

The decoder 220 determines a compression scheme used to generate the Tx data group DQm on the basis of the mode signal mode, and determines whether or not the data group Dn is compressed using the flag information CF. The decoder 220 decodes the Tx data group DQm on the basis of a predetermined pattern ptn, and recovers the data group Dn.

In an embodiment, the memory device 200 further includes a storage circuit 230. The storage circuit 230 may store the recovered data group Dn and may include a memory cell array. The storage circuit 230 may include a memory cell array composed of volatile or non-volatile memory cells.

The controller 100 and the memory device 200 shown in FIG. 1 may be used as physical constituent elements, may be populated on a printed circuit board (PCB), and may be interconnected through the PCB, such that the controller 100 and the memory device 200 may each be circuits in different devices.

Figure 2:
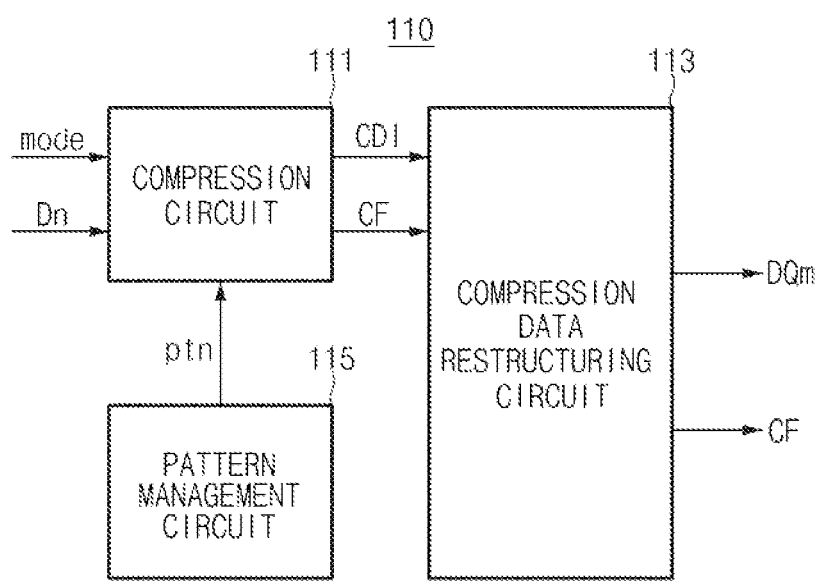
FIG. 2 illustrates a diagram of an encoder according to an embodiment.

FIG. 2 is a diagram of the encoder 110 of FIG. 1 according to an embodiment. The encoder 110 includes a compression circuit 111, a compression data restructuring circuit 113, and a pattern management circuit 115.

The compression circuit 111 compresses a data group Dn on the basis of a mode signal mode and a pattern ptn and generate a compressed data group CDQI and flag information CF indicating compression and non-compression of the data group Dn. The compression circuit 111 outputs the resultant compressed data group CDQI and the flag information CF to the compression data restructuring circuit 113.

The compression circuit 111 compares the pattern ptn with the data group Dn either in blocks according to an I/O width or in blocks according to a burst length, according to the mode signal mode. That is, if the mode signal mode includes a first value, the pattern ptn may be compared to a block comprising a plurality of bits transmitted in parallel at a same time and equal in number to the I/O width, and if the mode signal mode includes a second value, the pattern ptn may be compared to a block comprising a plurality of bits transmitted sequentially through a same connector at a plurality of points in time and equal in number to the burst length.

When a first portion of the predetermined pattern ptn, the first portion having a number of bits equal to a number of bits in the block, matches the block, the compression circuit 111 may perform data compression by replacing the block with a second portion of the predetermined pattern ptn.

When the compression circuit 111 performs the comparison using the first portion having a number of bits equal to the I/O width, the second portion of the pattern ptn has fewer bits than the I/O width. When the compression circuit 111 performs the comparison using the first portion having a number of bits equal to the burst length, the second portion of the pattern ptn has fewer bits than the burst length.

The pattern ptn stored in the pattern management circuit 115 may be fixed, or may be updated according to an external input. In other words, the predetermined pattern ptn of the data processing device 10 may not be fixed, and may be changed by a user's selection or by an external command.

The compression data restructuring circuit 113 restructures the compressed data group CDQI having a burst length different from an original burst length, and generates a transmission (Tx) data group DQm. The Tx data group DQm may have the same I/O width IOW as that of the data group Dn, and the restructured burst length may be determined on the basis of flag information CF (i.e., by the degree of compression of the data group Dn).

The compression data restructuring circuit 113 may identify, using the flag information CF, each block of the data group compressed according to an I/O width or according to a burst length BL. The compression data restructuring circuit 113 can calculate a new burst length, and generate the compressed data group CDQI having the new burst length as the transmission data group DQm. A detailed description thereof will be described with reference to FIG. 6.

FIG. 3 illustrates a data group Dn for data processing according to an embodiment. The data group Dn has an I/O width IOW of 8 bits D0 through D7, and has a burst length BL of 16. The data processing device 10 compresses the data group Dn in blocks according to the I/O width IOW or the burst length BL.

The data group Dn has the burst length of 16, and accordingly includes first through sixteenth bursts B0 through B15. Each of the bursts B0 through B15 includes first through eighth data bits D0 through D7, and each burst is one I/O unit that is simultaneously transmitted/received. Accordingly, the data group Dn has an I/O width IOW of 8 bits.

Compressing the data group Dn in blocks according to the I/O width IOW will hereinafter be described in detail. In order to compress the data group Dn, the compression circuit 111 compares each of bursts B0 through B15 with a predetermined pattern ptn. The above-mentioned compression scheme compares simultaneous transmitted/received signals with the predetermined pattern ptn, and performs data compression according to a result of the comparison.

A method for performing data compression by comparing the predetermined pattern ptn with each of the first to sixteenth bursts B0 to B15 transmitted/received in blocks according to the I/O width IOW at each point in time will hereinafter be described with reference to FIGS. 3 through 5.

FIG. 4 shows a predetermined pattern ptn stored in the pattern management circuit 115 of the data processing device 10 according to an embodiment. The pattern ptn includes patterns P0 through P15, each having a first portion including I/O-width-based patterns D0 through D7 and a second portion including compression patterns CP0 through CP3. The patterns P0 through P15 map 8-bit I/O-width-based patterns D0 through D7 to compression patterns CP0 through CP3.

Each of the first burst B0, the fourth burst B3, the seventh burst B6, the tenth burst B9, the thirteenth burst B12, and the sixteenth burst B16 of the data group Dn shown in FIG. 3 is denoted by "00001111", and is mapped through pattern P12 shown in FIG. 4 to a first compression pattern CP0 through CP3 of "0011". Similarly, each of the second burst B1, the fifth burst B4, the eighth burst B7, the eleventh burst B10, and the fourteenth burst B13, denoted by "11110000", is mapped through pattern P3 to a second compression pattern CP0 through CP3 of "1100".

Referring to FIG. 5, the bursts other than the third burst B2, sixth burst B5, ninth burst B8, twelfth burst B11, and the fifteenth burst B14 are compressed according to a match between the pattern ptn and each burst. An I/O width of the compressed bursts is reduced to 4 bits, and flag information CF of the compressed bursts is generated as the value of '1'. Flag information CF of the uncompressed bursts B2, B5, B8, B11, and B14, which have no matches in the pattern ptn, is generated as the value of '0'.

The I/O width-based pattern comparison and compression of the data group Dn and generation of flag information CF as illustrated by FIGS. 3 to 5 may be carried out by the compression circuit 111.

Because a plurality of bits of data are simultaneously transmitted on an I/O width basis, if the compressed data is transmitted without change from what is shown in FIG. 5, so that each compressed burst is supplied at its own point in time, the remaining 4 bits of an I/O width are assigned no values when the data is transmitted. As a result, there is no beneficial effect on a burst length BL. Since the burst length BL substantially determines the transmission and reception times of data, reducing the burst length BL is desirable.

The compression data restructuring circuit 113 addresses this issue by calculating a new burst length BL' on the basis of the flag information CF, the pattern ptn, and the I/O width IOW. The flag information CF indicates whether compression is performed for each compressed block of the data, and the pattern ptn may be used to determine the number of bits reduced by the compression.

The compression data restructuring circuit 113 may not always analyze all the information in the pattern ptn, as the compression data restructuring circuit 113 may receive sufficient information regarding the compression degree through identification of the pattern ptn. For example, the pattern ptn shown in FIG. 4 replaces data having an I/O width of 8 bits with a 4-bit compression pattern CP0 through CP3. Therefore, for each compression block that is compressed, 4 bits of data reduction occurs.

The compression data restructuring circuit 113 can calculate a new burst length BL' on the basis of the number of bits reduced by each compression, the number of compressions performed, and the I/O width IOW.

Referring to FIG. 5, flag information CF indicating data compression has a bit value of "1", and the number of bits reduced through compression based on a comparison between the pattern ptn and the bits is 4. In other words, 4 bits are compressed and reduced through each pattern comparison that results in a compression block being compressed.

The flag information CF has 11 bits having a value "1", and the reduction in the number of bits that results from each compressed compression block is 4. If the above two values are multiplied, the total reduction in the number of bits produced by the compression operation of the compression circuit 111 is calculated. The total reduction in the number of bits is then divided by the I/O width IOW, and the result of the division is then rounded by applying a function "ROUNDDOWN".

A new burst length is then calculated by subtracting the result of the ROUNDDOWN function from the conventional (that is, pre-compression) burst length BL, as represented by the following equation 1.

$$NBL = CBL - ROUNDDOWN\left(\frac{NCFcomp * NBcomp}{IOWidth}\right) \quad \text{Equation 1}$$

wherein NBL is a new burst length BL', CBL is a conventional (that is, uncompressed) burst length BL, NCFcomp is a number of information flags CF indicating compression, NBcomp is a number of bits reduced by each compression, and IOWidth is an I/O width IOW.

The compression data restructuring circuit 113 calculates a new burst length BL' of 11, and restructures the compressed data group CDQI accordingly.

The compression data restructuring circuit 113 pulls respective bursts of the compressed data group CDQI to an empty space of the I/O width IOW, and restructures the bursts, such that the compression data restructuring circuit 113 can generate a transmission (Tx) data group DQm.

Restructuring the compressed data group CDQI to have an I/O width IOW will hereinafter be described with reference to FIG. 6.

Referring to FIG. 6, the compression data restructuring circuit 113 may restructure the compressed data group CDQI in response to a new burst length BL'. The first burst B0 and the second burst B1 of FIG. 5 are restructured as a first new burst NB0, the third burst B2 is restructured as a second new burst NB1, and the fourth burst B3 and the fifth burst B4 are restructured as a third new burst NB2.

A new-burst restructuring process may be carried out by a bit-pulling process according to whether a preceding burst is compressed. That is, because the first burst B0 is compressed, the second burst B1 is pulled forward by the number of bits reduced by one compression. Because the first burst B0 and the second burst B1 are each compressed, each of the third burst B2 and the fourth burst B3 is pulled forward by the number of bits reduced by two compressions, that is, by 8 bits.

Similarly, each burst is pulled forward according to the number of previous bursts that were compressed, so that the sixteenth burst B15 is pulled forward by 40 bits and restructured as a portion of the eleventh new burst NB10.

If the compressed data group CDQI is restructured as shown in FIG. 6, the burst length is reduced from 16 to 11 so that a data transfer rate can be improved.

The restructured data is shown in FIG. 6. Because the eleventh new burst NB10 is the last burst having valid data, the restructured Tx data group DQm can reduce a time needed for transmission of valid data as compared to FIG. 3 or FIG. 5.

In an embodiment, the transmitter 120 of the controller 100 can transmit the flag information CF and the restructured bursts NB0 through NB10 shown in FIG. 6 through different physical connectors, and a data format of the new bursts restructured as shown in FIG. 6 is referred to as the Tx data group DQm.

In an embodiment, when the transmitter 120 transmits the Tx data group DQm, instead of transmitting for only the new burst length BL', dummy values may be transmitted as the twelfth through sixteenth bursts B12 through B16. In an embodiment, the transmitter 120 may transmit an output ground voltage VSSQ or an output power-supply voltage VDDQ as dummy values.

In the eleventh new burst NB10, only 4 bits are defined as being part of the Tx data group DQm, and the remaining 4 bits are undefined, so 4 bits of dummy values can also be supplied as part of the eleventh new burst NB10.

Although a transmission (Tx) rate of the Tx data group DQm may not be reduced when dummy values are transmitted, I/O drive power may be reduced. In addition, if the memory device 200 receiving the Tx data group DQm receives information indicating the new burst length BL', values transmitted after the new burst length BL' may be discarded.

In another embodiment, the transmitter 120 may parallelize the flag information CF according to the I/O width IOW, and transmit the parallelized flag information CF through the same physical connector as used to transmit the Tx data group DQm. In such an embodiment, an additional connector for transmitting the flag information CF may not be required.

FIG. 7 is a diagram according to an embodiment in which the transmitter 120 parallelizes the flag information CF and transmits the parallelized flag information CF along with the Tx data group DQm.

Referring to FIG. 7, flag information CF0 through CF7, being flag information for the first burst B0 through the eighth burst B7, respectively, may be transmitted as a first flag burst FB0, and flag information CF8 through CF16, being flag information for the ninth burst B8 through the sixteenth burst B15, respectively, may be transmitted as a second flag burst FB1.

The transmitter 120 may rearrange the flag information CF according to an I/O width, and may sequentially transmit the flag information CF and the Tx data group DQm. Therefore, an additional connector need not be allocated for the flag information CF.

Although FIG. 7 shows that the first and second flag bursts FB0 and FB1 are transmitted before the Tx data group DQm, the first and second flag bursts FB0 and FB1 may be transmitted after the Tx data group DQm, or may be transmitted between bursts of the Tx data group DQm.

In an embodiment, whether the transmitter 120 transmits the flag information CF either to an additional connector or to the same physical connector as that of the Tx data group DQm may be determined according to the number of physical connectors allocated for transmission of the data group Dn.

If the number of physical connectors allocated for the transmission of the data group Dn shown in FIG. 3 is higher than the number of bits allocated for the I/O width, the flag information CF need not be rearranged. However, when the number of the physical connectors allocated for the transmission of the data group Dn has the same value as the I/O width IOW of the data group Dn, the flag information CF may be rearranged and transmitted using the physical connectors allocated for the transmission of the data group Dn.

In another embodiment, the scheme used by the transmitter 120 to transmit the flag information CF may be determined according to a command from an external device such as a host.

FIG. 8 illustrates a data group related to an embodiment described below.

As in FIG. 3, the data group Dn shown in FIG. 8 has an I/O width IOW of 8 bits, including bits D0 through D7, and a burst length BL of 16. The data processing device 10 compresses the data group Dn using blocks having the burst length BL as will hereinafter be described.

The scheme for compressing the data group Dn on the basis of the burst length BL compares groups of sequential values of each of data D0 through D7, each of which is transmitted/received through one physical connector.

In FIG. 8, data transmitted/received in units of the burst length BL through one physical connector will hereinafter be referred to as first through eighth data slices D0 through D7, respectively.

The compression circuit 111 compares each of the first through eighth data slices D0 through D7 with a pattern ptn, and performs data compression.

FIG. 9 illustrates a pattern ptn stored in the pattern management circuit 115.

Referring to FIG. 9, the pattern ptn is mapped on the basis of a burst length of 8. Because the first to eighth data slices D0 through D7 each have a burst length of 16, each data slice D0 through D7 may be compressed two times.

The compression operation of the compression circuit 111 will hereinafter be described with reference to FIGS. 8 and 9. The compression circuit 111 divides the first data slice D0 into a first sequence "00001111" of 8 bits and a second sequence "00001111" of 8 bits according to a length of the pattern ptn, and compares each of the first and second sequence with the pattern ptn. Each of the first and second sequences of the first data slice D0 matches a first portion B0 through B7 of the fourth pattern P3, and therefore each sequence is compressed to "0011" corresponding to a second portion CP0 through CP3 of the fourth pattern P3. As a result, a first compression data CDQ0 corresponding to the compressed first data slice D0 is denoted by "00110011", that is, by the concatenation of the compressed first sequence and compressed second sequence.

The compression circuit 111 generates the first compression data CDQ0 by compressing the first data slice D0 two times, and therefore generates first sequence flag information CF0a of "1" and second sequence flag information CF0b of "1". The first and second sequence flag information CF0a and CF0b generated by compression of the first data slice D0 may be allocated to a first bit and a second bit.

The compression circuit 111 also compares each of first and second 8-bits sequences "00001111" and "10001111" of the third data slice D2 with the pattern ptn. Although "00001111" is identical to the fourth pattern P3 and is therefore compressed into "0011", there is no pattern in the pattern ptn that is identical to "10001111", and therefore "10001111" is not compressed.

Therefore, the compression circuit 111 generates the third data CDQ2 "001110011111" by concatenating the compressed first sequence ("0011") and uncompressed second sequence ("10001111") of the third data slice D2, and generates first sequence flag information CF2a of "1" and second sequence flag information CF2b of "0".

Similarly to when the compressed data group CDQI is generated by performing comparisons using blocks corresponding to the I/O width, the compression data restructuring circuit 113 may calculate a new burst length BL'. However, because data compression is performed along a direction of the burst length BL as shown in FIG. 10, the compressed data may not need to be restructured to take advantage of the new burst length BL'.

The compression data restructuring circuit 113 may calculate a maximum burst length of the compression data group CDQI on the basis of the flag information CF. For example, in association with each of the first through eighth data slices D0 through D7, compression for the first sequence of 8 bits and compression for the second sequence of 8 bits are performed, and two contiguous bits of the flag information CF may indicate a compression state of each data slice. A minimum burst length of the compressed data can be determined on the basis of the two contiguous bits of the flag information CF, such that this burst length can be calculated as a new burst length BL'.

Referring to FIG. 10, since each of the third, fourth, seventh, and eighth compressed data slices CDQ2, CDQ3, CDQ6, and CDQ7 has only one of the two corresponding sequences compressed, flag information for each slice may correspond to "10" or "01".

The compression data restructuring circuit 113 subtracts the number of bits reduced by compression from a conventional (that is, uncompressed) burst length. In this case, since the pattern ptn compresses 8 bits into 4 bits, 4 bits may be reduced by each compression, such that the number of bits may be set to 4 for convenience of description and better understanding of the present disclosure. Accordingly, for the compressed data slices having only one compression, a new burst length BL' is calculated as 12 by subtracting 4 from 16.

As described above, assuming that the compression circuit 111 compresses the data group Dn in blocks having a burst length BL according to a mode signal mode, only a new burst length may be calculated and the compressed data group CDQI may not be restructured. Accordingly, the Tx data group DQm may be identical to the compressed data group CDQI.

FIG. 11 shows that flag information CF may be rearranged according to an I/O width IOW in the same manner as was discussed in relation to FIG. 7.

Referring to FIG. 11, the transmitter 120 may parallelize the flag information CF, such that it can sequentially transmit the first flag burst FB0 and the second flag burst FB1 along with the Tx data group DQm through the same physical connector.

Figure 12:
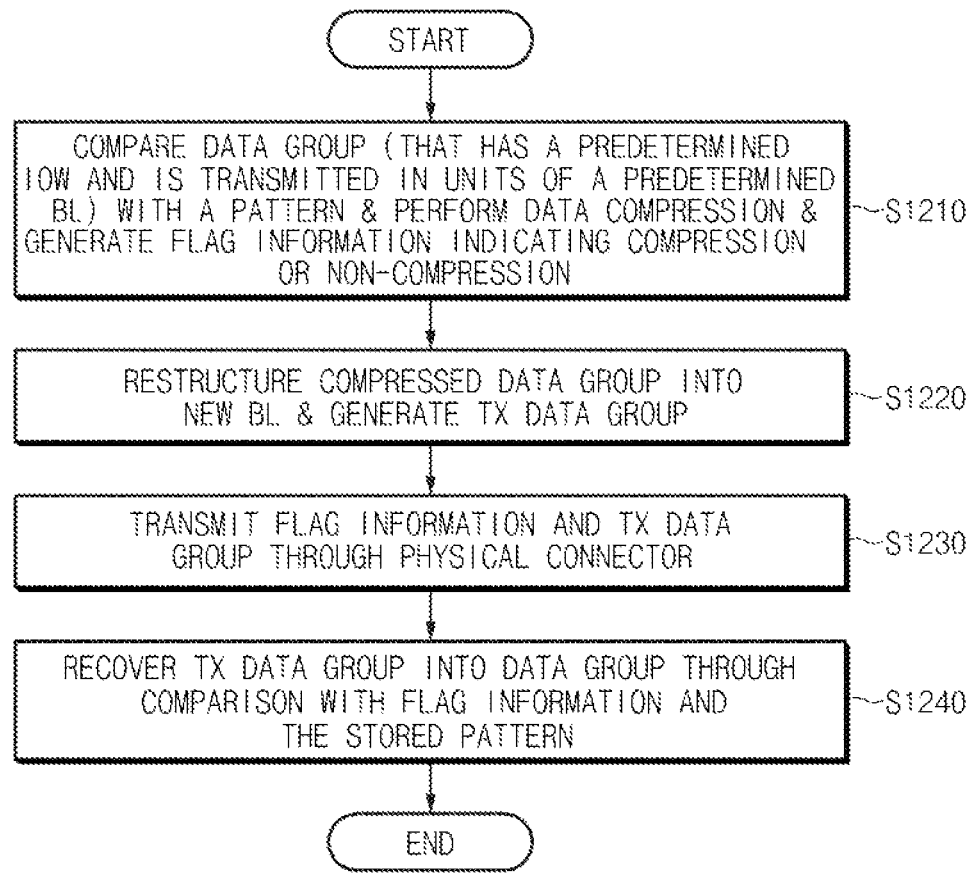
FIG. 12 illustrates a flowchart of data processing according to an embodiment.

FIG. 12 illustrates a flowchart of data processing according to an embodiment, which is described in relation to FIGS. 1 and 2.

Referring to FIG. 12, at S1210, the compression circuit 111 included in the encoder 110 compares a data group Dn (which includes a predetermined burst length BL number of bursts, each burst having a predetermined I/O width IOW number of bits) with a predetermined pattern ptn stored in the pattern management circuit 115, performs data compression according to a result of the comparison, and generates flag information CF indicating compression or non-compression of the data group Dn.

The compression circuit 111 may generate a compressed data group CDQI by comparing the data group Dn with the pattern ptn using blocks according to the I/O width IOW, or by comparing the data group Dn with the pattern ptn using blocks according to the burst length BL, as specified by a received mode signal mode.

The compression circuit 111 may provide the compressed data group CDQI and the flag information CF to the compression data restructuring circuit 113. At S1220, the compression data restructuring circuit 113 may restructure the compressed data group CDQI to have a new burst length BL', and may generate the Tx data group DQm. In an embodiment, the compression data restructuring circuit 113 may also provide the compressed data group CDQI as the Tx data group DQm to the transmitter 120 without change. That is, the data restructuring operation of the compression data restructuring circuit 113 may be selectively carried out, and may be based on the mode signal mode.

If the compression is achieved by I/O-width-based comparison, the compression data restructuring circuit 113 calculates a new burst length BL' by determining the number of bits reduced by the compression, dividing the determined number of bits by the I/O width IOW, rounding down the division result using a ROUNDDOWN function, and subtracting the rounded-down result from a conventional (that is, an uncompressed) burst length.

The compression data restructuring circuit 113 may restructure the compressed data group CDQI on the basis of the flag information CF and the I/O width IOW, and may generate the Tx data group DQm.

If data compression is performed using blocks according to the burst length BL, the compression data restructuring circuit 113 may calculate a burst length of minimally (i.e. least) compressed data as a new burst length BL'.

At S1230, the transmitter 120 transmits the flag information CF and the Tx data group DQm through a physical connector. In an embodiment, the flag information CF may be transmitted through a first physical connector different from a second physical connector used to transmit the Tx data group DQm. In another embodiment, the flag information CF may be restructured into bursts of I/O width IOW by the transmitter 120 such that the flag information CF can be sequentially transmitted through the same physical connector as that of the Tx data group DQm.

In addition, according to the burst length BL and the I/O width IOW, the transmitter 120 may transmit a dummy value along with the Tx data group DQm.

At step S1240 the memory device 200 receives the Tx data group DQm and the flag information CF through the physical connector, and decodes the Tx data group DQm using the received Tx data group DQm, the received flag information CF, and the stored pattern ptn, resulting in recovery of the data group Dn.

Figure 13:
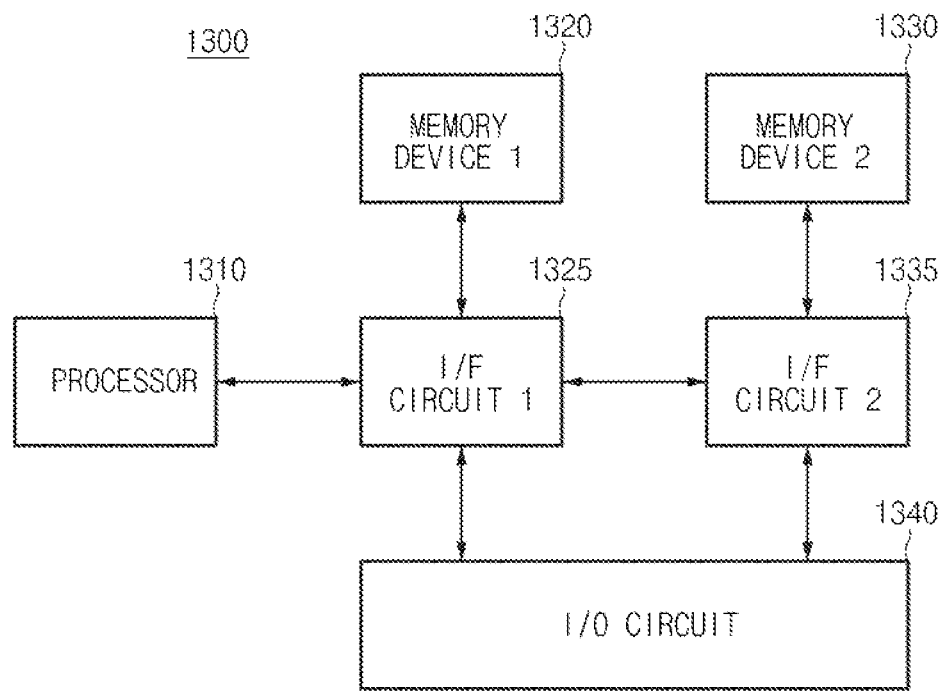
FIG. 13 is a diagram of a computing system including a data processing apparatus according to an embodiment.

FIG. 13 is a diagram of a computing system including the data processing apparatus 10 according to an embodiment. The computing system 1300 includes a processor 1310, first and second memory devices 1320 and 1330, and first and second interface (I/F) circuits 1325 and 1335.

The processor 1310 may correspond to the controller 100 of FIG. 1, and the memory devices 1320 and 1330 may correspond to the memory device 200 of FIG. 1.

The computing system 1300 may include various digital computers, for example, a laptop, a desktop, a workstation, a personal digital assistant (PDA), a server, a blade server, a mainframe, and the like.

Constituent elements of the computing system 1300 may be populated on a printed circuit board (PCB) such as a mother board. The processor 1310 and the first memory device 1320 may be interconnected through the first interface circuit 1325, and the processor 1310 and the second memory device 1330 may be interconnected through the second interface circuit 1335.

The processor 1310 may process a command executed in the computing system 1300. The command processed by the processor 1310 may include a command to perform high-speed data I/O operations using the first memory device 1320, and/or may include a command to perform low-speed data I/O operations using the second memory device 1330. In an embodiment, multiple processors and/or multiple buses may be used along with multiple memories and memory types.

In an embodiment, the processor 1310 compares the data group Dn (that has a predetermined burst length BL and will be transmitted on the basis of an I/O width IOW) with a predetermined pattern, and performs data compression according to the comparison result, upon receiving a command (i.e., a mode signal mode) indicating the data processing scheme, such that the processor 1310 provides the Tx data group DQm according to the compression result.

The Tx data group DQm generated by the processor may be transmitted along with the flag information CF to the first memory device 1320 or the second memory device 1330.

The first memory device 1320 and the second memory device 1330 may store various pieces of information in the computing system 1300. In an embodiment, the first memory device 1320 and the second memory device 1330 may include volatile memory devices or non-volatile memory devices. The volatile memory device and the non-volatile memory device may include a volatile memory cell array and a non-volatile memory cell array, respectively, and may further include various circuits for writing and reading data in/from each memory cell array.

In an embodiment, the first interface circuit 1325 may perform high-speed interfacing, and the first memory device 1320 may include a volatile memory cell array configured to support high-speed operations. The first memory device 1320 may store various information in the computing system 1300. In an embodiment, the first interface circuit 1325 may be coupled to a high-speed extension port capable of accommodating various extension cards.

The second interface circuit 1335 may perform low-speed interfacing, and the second memory device 1330 may include a non-volatile memory cell array configured to support low-speed operations. The second memory device 1330 may provide a mass storage for the computing system 1300. In an embodiment, the second memory device 1330 may include a floppy disc drive, a hard disc drive (HDD), an optical disc device, a tape unit, a flash memory or other similar solid-state memory devices, a storage-area network, or combinations thereof.

In an embodiment, the second interface circuit 1335 may be coupled to a low-speed extension port. The low-speed extension port may include any of various communication ports (e.g., USB, Bluetooth, Ethernet, Wireless Ethernet, etc.) and may be coupled to the networking device through a network adaptor.

Each of the first and second memory devices 1320 and 1330 may include a plurality of memory chips. In an embodiment, either or both of the first and second memory devices 1320 and 1330 may be implemented as a plurality of stacked dies.

The first and second memory devices 1320 and 1330 may perform a data recovery operation on the Tx data DQm received from the processor 1310 on the basis of the mode signal mode and the flag information CF.

The first and second interface circuits 1325 and 1335 may perform interfacing between constituent elements having different operation speeds in the computing system 1300. Arrangement of the above constituent elements shown in the drawings is disclosed for illustrative purposes only, and embodiments are not limited thereto.

In accordance with an embodiment, the computing system 1300 may further include an input/output (I/O) circuit 1340. The I/O circuit 1340 may include an input circuit such as a keyboard or mouse and an output circuit such as a printer or display.

Embodiments of the present disclosure may be implemented by a digital electronic circuit, an integrated circuit (IC), an application specific integrated circuit (ASIC) designed for special purposes, hardware, firmware, software, and/or a combination thereof.

The computing system 1300 may be implemented by one or more computer programs. The computer program (also called a program, software, software application, or a code) may be implemented using one or more of machine instructions for a programmable processor, high-level procedure and/or object-oriented programming languages, and/or assembly/machine language.

The computer program can be executed on a programmable system. The programmable system may include at least one general- or special-purpose processor, at least one input circuit, and at least one output circuit, which are coupled to a storage system for transmission/reception of data and commands.

Constituent elements of the computing system 1300 may be interconnected in an arbitrary format or may be interconnected by a digital data communication medium (e.g., a communication network). The communication network may include one or more of a local area network (LAN), a Wide Area Network (WAN), and Internet.

Embodiments described above may compress data on the basis of a pattern, reduce a burst length in response to such compression, and minimize a transfer time of valid data, such that load of an I/O driver and a channel can be reduced.

An embodiment of the present disclosure compares data with a predetermined pattern, and performs data compression according to the result of comparison, resulting in reduction of an amount of data. As a result, a load of an I/O driver and/or a channel can be reduced.

Embodiments compress either in a burst length BL direction or in a data or I/O width direction, such that data is properly compressed according to characteristics of the data.

In addition, embodiments can reduce or prevent an increase in I/O power arising from using higher frequencies, and can improve the quality pf transmission data by reducing the amount of transmission data.

Embodiments of the present disclosure may be carried out in ways other than those set forth herein without departing from the spirit and essential characteristics of the present disclosure. The above embodiments are therefore to be construed in all aspects as illustrative and not restrictive. The scope of the appended claims should be determined by the claims and their legal equivalents, not by the above description, and all changes coming within the meaning and equivalency range of the appended claims are intended to be embraced therein. Claims that are not explicitly cited in each other in the appended claims may be presented in combination in an embodiment or included as a new claim by a subsequent amendment after the application is filed.

Although a number of embodiments have been described, numerous other modifications and embodiments can be devised by those skilled in the art that will fall within the spirit and scope of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent in light of the teachings and disclosures herein to those skilled in the art.

What is claimed is:

1. A data processing device comprising:
   a compression circuit configured to compare each burst of a data group with a predetermined pattern, and perform data compression on each burst of the data group based on a result of comparison, wherein a number of bursts of the data group corresponds to a first burst length, each burst of the data group before the data compression includes a number of bits equal to a first input/output (I/O) width, and each burst of the data group after the data compression includes a number of bits equal to a second input/output (I/O) width smaller than the first I/O width; and
   a compression data restructuring circuit configured to generate a transmission data group by restructuring the data group after the data compression to have a second burst length to prevent an increase in or reduce power, wherein each burst of the transmission data group includes a number of bits equal to the first I/O width.

2. The data processing device of claim 1, wherein the compression circuit compares the predetermined pattern with one or more blocks of the data group, wherein each block comprises a burst of the data group when a mode signal has a first value, and comprises a bit from each burst of the data group when a mode signal has a second value.

3. The data processing device of claim 2, wherein the compression circuit generates flag information indicating compression or non-compression of data for each block of the data group.

4. The data processing device of claim 3, wherein the compression data restructuring circuit calculates the second burst length on the basis of the first I/O width and a number of bits reduced by the data compression.

5. The data processing device of claim 4, wherein the compression data restructuring circuit is configured to generate the transmission data group by restructuring the compressed data group on the basis of the flag information.

6. The data processing device of claim 3, further comprising:
   a transmitter configured to rearrange and transmit the flag information and the transmission data group on the basis of the first I/O width.

7. The data processing device of claim 6, wherein the transmitter transmits the flag information before or after transmitting the transmission data group.

8. The data processing device of claim 6, wherein the transmitter transmits a dummy value with the transmission data group.

9. The data processing device of claim 6, further comprising:
   a memory device coupled to the transmitter through physical connectors corresponding to the first I/O width.

10. The data processing device of claim 9, wherein the flag information is transmitted to the memory device through a physical connector other than a physical connector through which the transmission data group is transmitted to the memory device.

11. The data processing device of claim 10, wherein the compression circuit compares the predetermined pattern with the blocks of the data group including a plurality of bits that is transmitted through the same physical connector when the mode signal has the second value.

12. The data processing device of claim 9, wherein the memory device includes:
    a decoder configured to decompress the transmission data group on the basis of the flag information and the predetermined pattern, and recover the data group; and
    a storage circuit configured to store the recovered data group.

13. The data processing device of claim 1, further including a pattern management circuit configured to store the predetermined pattern.

14. A data processing method comprising:
    comparing each burst of a data group with a predetermined pattern, wherein a number of bursts of the data group corresponds to a first burst length, each burst of the data group includes a number of bits equal to a first input/output (I/O) width;
    performing data compression on each burst of the data group based on a result of the comparison, wherein each burst of the data group after the data compression includes a number of bits equal to a second input/output (I/O) width smaller than the first I/O width;
    generating flag information indicating compression or non-compression of data;
    generating a transmission data group by restructuring the data group after the data compression according to a second burst length to prevent an increase in or reduce power, wherein each burst of the transmission data group includes a number of bits equal to the first I/O width; and
    transmitting the flag information and the transmission data group through a physical connector.

15. The data processing method of claim 14, wherein performing the data compression includes:
    comparing the data group with the predetermined pattern in units of the first I/O width when a mode signal has a first value, and comparing the data group with the predetermined pattern in units of the first burst length when the mode signal has a second value; and
    generating the compressed data group based on the result of comparison.

16. The data processing method of claim 14, wherein transmitting the flag information and the transmission data group includes rearranging the flag information in units of the first I/O width, and sequentially transmitting the flag information along with the transmission data group through a same physical connector.

17. The data processing method of claim 14, wherein generating the transmission data group includes:
   calculating the second burst length on the basis of the number of bits reduced by compression and the first I/O width; and
   restructuring the compressed data group on the basis of the flag information and the first I/O width, and generating the transmission data group.

18. The data processing method of claim 14, wherein transmitting the transmission data group includes transmitting a dummy value with the transmission data group.

19. The data processing method of claim 18, further comprising recovering the data group by decoding the transmission data group on the basis of the flag information and the predetermined pattern.

* * * * *